United States Patent
Ajiki

(10) Patent No.: US 7,692,478 B2
(45) Date of Patent: Apr. 6, 2010

(54) SEMICONDUCTOR DEVICE AND BOOSTER CIRCUIT

(75) Inventor: Yoshiharu Ajiki, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 819 days.

(21) Appl. No.: 11/426,153

(22) Filed: Jun. 23, 2006

(65) Prior Publication Data

US 2006/0290413 A1 Dec. 28, 2006

(30) Foreign Application Priority Data

Jun. 23, 2005 (JP) ............................... 2005-183301
Jun. 21, 2006 (JP) ............................... 2006-171354

(51) Int. Cl.
*H02M 3/18* (2006.01)
*G05F 3/16* (2006.01)
*H01L 21/822* (2006.01)
*H01L 27/092* (2006.01)

(52) U.S. Cl. ........................... 327/536; 363/60; 307/110

(58) Field of Classification Search ........................ None
See application file for complete search history.

(56) References Cited

U.S. PATENT DOCUMENTS

| | | | |
|---|---|---|---|
| 5,576,565 A | 11/1996 | Yamaguchi et al. | |
| 6,452,249 B1 | 9/2002 | Maeda et al. | |
| 6,515,903 B1 * | 2/2003 | Le et al. | 365/185.18 |
| 6,611,041 B2 | 8/2003 | Maeda et al. | |
| 6,654,263 B2 * | 11/2003 | Kurotsu | 363/60 |
| 6,697,280 B2 | 2/2004 | Natori | |
| 6,707,335 B2 | 3/2004 | Kawai et al. | |
| 6,834,001 B2 * | 12/2004 | Myono | 363/60 |
| 6,879,502 B2 * | 4/2005 | Yoshida et al. | 363/60 |
| 6,967,523 B2 * | 11/2005 | DeMone | 327/537 |
| 7,095,249 B2 | 8/2006 | Mitarashi | |
| 7,199,641 B2 * | 4/2007 | Wei | 327/427 |

FOREIGN PATENT DOCUMENTS

| | | |
|---|---|---|
| CN | 1186874 | 1/2005 |
| EP | 1191479 A | 3/2002 |
| JP | A-06-338589 | 12/1994 |
| JP | A-07-194098 | 7/1995 |
| JP | A-08-335704 | 12/1996 |
| JP | A-2001-308273 | 11/2001 |
| JP | A-2003-036685 | 2/2003 |
| JP | A 2004-172631 | 6/2004 |
| JP | A-2004-228787 | 8/2004 |
| JP | A-2005-011475 | 1/2005 |

* cited by examiner

*Primary Examiner*—Lincoln Donovan
*Assistant Examiner*—Terry L Englund
(74) *Attorney, Agent, or Firm*—Oliff & Berridge, PLC

(57) ABSTRACT

A booster circuit includes a first transistor performing a first on-off operation based on a first control signal and a second transistor performing a second on-off operation based on the first control signal. The first on-off operation and the second on-off operation are reversed. A third transistor performs the first on-off operation based on a second control signal. The second control signal has a phase opposite the first control signal. A fourth transistor is included in a metal oxide semiconductor capacitor.

4 Claims, 5 Drawing Sheets

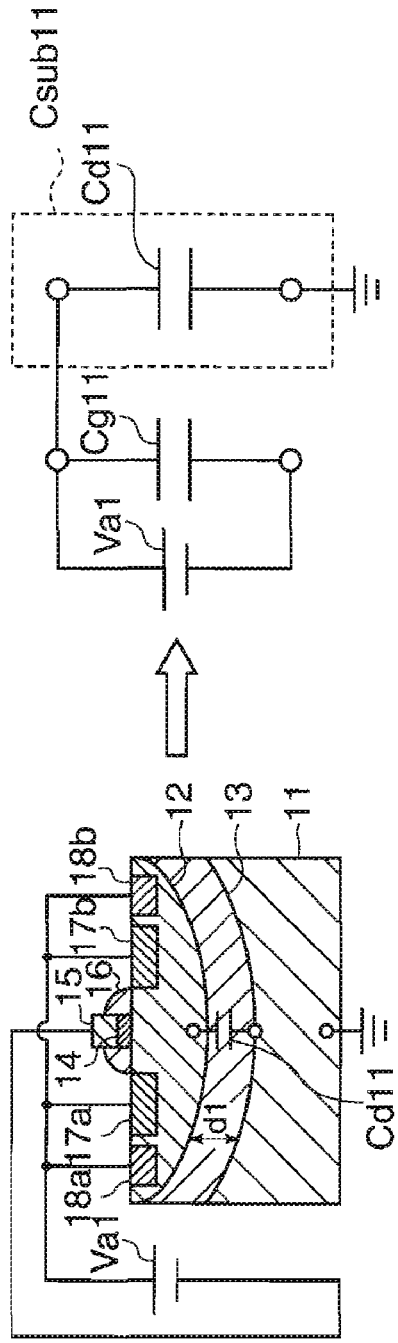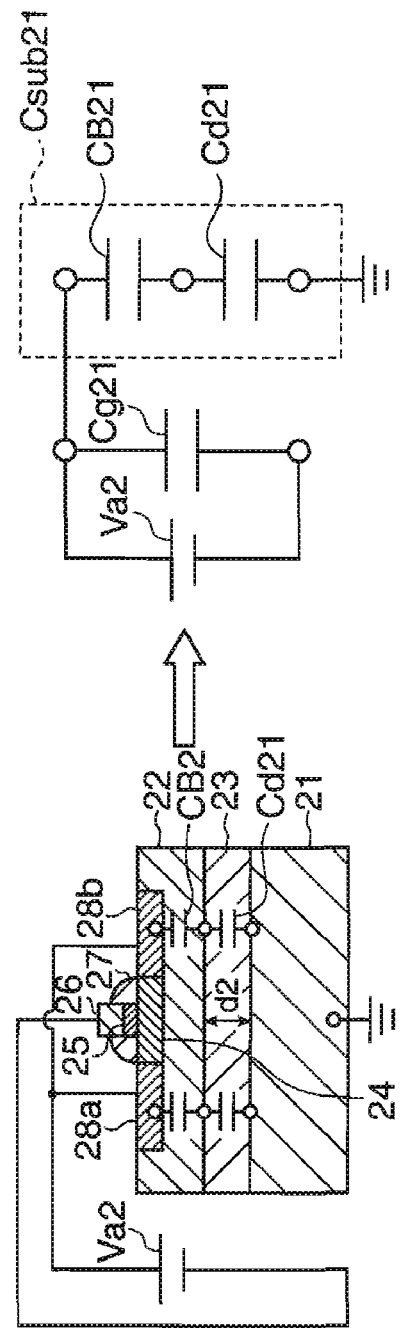
FIG. 4A
FIG. 4B

SEMICONDUCTOR DEVICE AND BOOSTER CIRCUIT

BACKGROUND

1. Technical Field

The present invention relates to a semiconductor device and a booster circuit, and is particularly preferable to apply to a switched-capacitor DC-DC converter.

2. Related Art

In recent years, accompanying the developments of semiconductor manufacturing processes, semiconductor integrated devices have been integrated in highly density and become multifunctional. As a result, a power supply voltage inside a semiconductor integrated device circuit tends to be lowered. In addition, various power supply sources including high voltage power supply sources have been incorporated as the semiconductor integrated circuits become multifunctional. For example, a high voltage of 10 V or more is required in nonvolatile memories such as flash memories, and EEPROMs, and driver ICs for display elements such as liquid crystal displays. Thus, a charge pump method, which is easily incorporated into the semiconductor integrated devices, is employed as a booster circuit to generate such high voltage instead of a switching regulator method using coils and so on. As the charge pump method, Dickson charge pump circuit is typically used.

In order to achieve higher conversion efficiency than the charge pump circuit, a method using a DC-DC converter that employs a switched-capacitor method, i.e. switched-capacitor DC-DC converter, as a booster circuit is disclosed in JP-A-2004-172631. In the switched-capacitor method, a plurality of kick capacitors to which power supply voltage is applied parallel, is switched to be connected in series by a switching element, thereby a boosted output voltage can be output.

However, in a case where a kick capacitor used for the switched-capacitor method is structured by a MOS capacitor, a problem arises in that boosted voltage is lowered since a depletion layer capacitance formed along a bonded surface of a well and a substrate acts as a parasitic capacitance.

In contrast, in a case where the kick capacitor is structured by a $SiO_2/Si_3N/SiO_2$ (ONO) capacitor having a polysilicon layer as its upper and lower electrodes, a problem arises in that an element area increases.

SUMMARY

An advantage of the invention is to provide a semiconductor device and a booster circuit that can reduce the parasitic capacitance of a kick capacitor while increasing of the element area is depressed.

A semiconductor device according to a first aspect of the invention includes: a semiconductor substrate; a buried oxide (BOX) layer formed on the semiconductor substrate; a semiconductor layer formed on the BOX layer; a plurality of metal oxide semiconductor (MOS) capacitors formed on the semiconductor layer; and a switching element formed on the semiconductor substrate. The switching element switches a first condition in which the plurality of MOS capacitors are connected parallel so that a direct current voltage is applied in common to the plurality of MOS capacitors, and a second condition in which the plurality of MOS capacitors connected parallel is connected in series.

According to the first aspect of the invention, a BOX layer capacitance can be capacitively coupled in series with a depletion layer capacitance formed in the semiconductor substrate, thereby a parasitic capacitance that acts to the MOS capacitor can be reduced. As a result, a kick capacitor used in a switched capacitor method can be structured by a MOS capacitor while the parasitic capacitance is lowered, thereby a boosted voltage can be increased while increasing of an element area is depressed.

In the semiconductor device according to the first aspect of the invention, the switching element may be formed in a bulk region of the semiconductor substrate.

This makes it possible to prevent a breakdown voltage of the switching element from being deteriorated even in a case where the MOS capacitor includes a silicon on insulator (SOI) structure. As a result, a boosted voltage can be increased.

A booster circuit according to a second aspect of the invention includes: a first electric field effect transistor performing a first on-off operation based on a first control signal; a second electric field effect transistor performing a second on-off operation based on the first control signal, the first on-off operation and the second on-off operation being reversed; a third electric field effect transistor performing the first on-off operation based on a second control signal having a phase opposite the first control signal; and a fourth electric field effect transistor included in a MOS capacitor. Sources of the first electric field effect transistor and the second electric field effect transistor are coupled to a gate of the fourth electric field effect transistor, a drain of the first electric field effect transistor is coupled to a source of the third electric field effect transistor, a drain of the third electric field effect transistor is coupled to a source and a drain of the fourth electric field effect transistor, and the fourth electric field effect transistor includes a silicon on insulator (SOI) structure.

According to the second aspect of the invention, a BOX layer capacitance can be capacitively coupled in series with a depletion layer capacitance formed under the channel of the fourth electric field effect transistor, thereby a parasitic capacitance that acts to the MOS capacitor can be reduced even in a case where the MOS capacitor is structured by the fourth electric field effect transistor. As a result, a kick capacitors used in a switched capacitor method can be structured by a MOS capacitor while the parasitic capacitance is lowered, thereby a boosted voltage can be increased while increasing of an element area is depressed.

In the booster circuit, the thickness of a buried oxide film of the SOI structure is preferably 10 nm or more, more preferably 57 nm or more.

In the booster circuit according to the second aspect of the invention, the first through third electric field effect transistors may be formed on a bulk substrate.

This makes it possible to prevent a breakdown voltage of the first through third electric field effect transistors from being deteriorated even in a case where the MOS capacitor includes an SOI structure. As a result, a boosted voltage can be increased.

BRIEF DESCRIPTION OF THE DRAWINGS

The invention will be described with reference to the accompanying drawings, wherein like numbers reference like elements.

FIGS. 4A and 4B are cross-sectional views and equivalent circuit diagrams illustrating the structure of the kick capacitor of the booster circuit in FIG. 1 compared to an example of related art.

DESCRIPTION OF EXEMPLARY EMBODIMENTS

A booster circuit device according to an embodiment of the present invention will be described below with reference to accompanying drawings.

Figure 1:
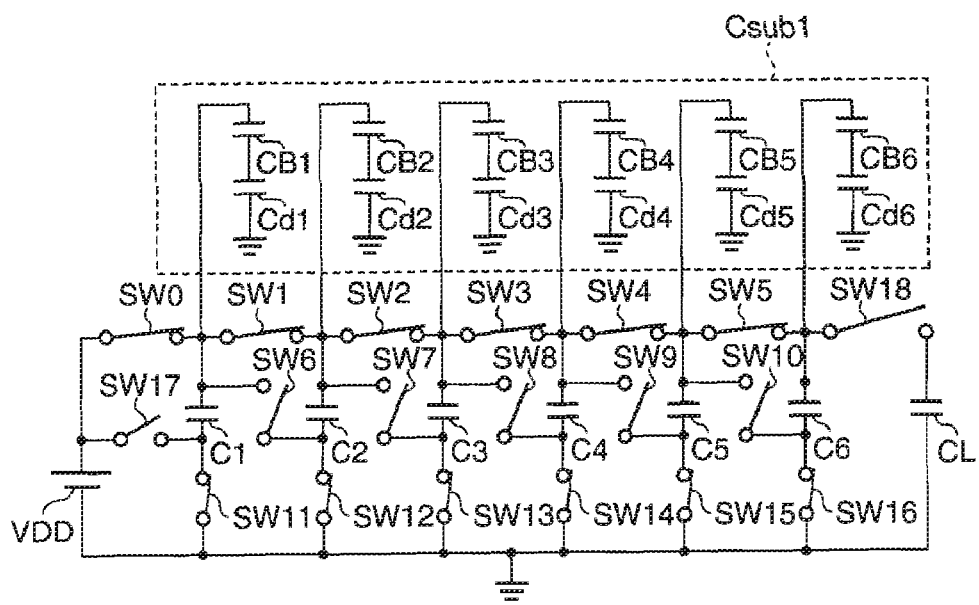
FIG. 1 is a circuit diagram illustrating the schematic structure of a booster circuit according to one embodiment of the present invention.

FIG. 1 is a circuit diagram illustrating the schematic structure of a booster circuit according to the embodiment of the present invention.

In FIG. 1, the booster circuit includes 6 stages of kick capacitors, i.e. 6 kick capacitors C1 to C6, storing an electric charge according to a voltage of a direct current power supply source VDD. The booster circuit also includes switches SW0 to SW5, and SW11 to SW16, which connect the kick capacitors C1 to C6 in parallel to the direct current power supply source VDD, and switches SW6 to SW10 and SW17, which connect the kick capacitors C1 to C6 connected in parallel to the direct current power supply source VDD in series. Further, the booster circuit includes a switch SW18 that outputs a boosted voltage boosted by the kicked capacitors C1 to C6, and a capacitor CL that separates the switch SW18 from the direct current power supply source VDD.

Here, the kick capacitors C1 to C6 can be structured by a MOS capacitor having an SOI structure. In the kick capacitors C1 to C6 structured by the MOS capacitor having the SOI structure, a parasitic capacitance Csub1 of the kick capacitors C1 to C6 is produced. The parasitic capacitance Csub1 is composed of depletion layer capacitances Cd1 to Cd6 formed in a semiconductor substrate, and BOX layer capacitances CB1 to CB6. Each of the depletion layer capacitances Cd1 to Cd6 is capacitively coupled in series with respective BOX layer capacitances CB1 to CB6.

Figure 2A:
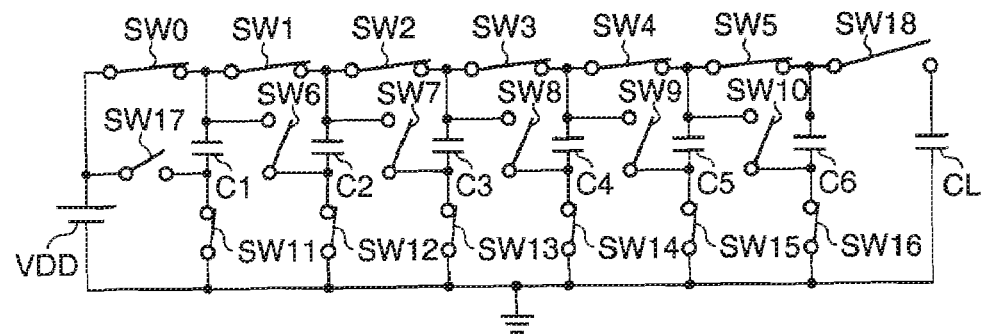
FIGS. 2A and 2B are circuit diagrams illustrating the operation of the booster circuit in FIG. 1.
Figure 2B:
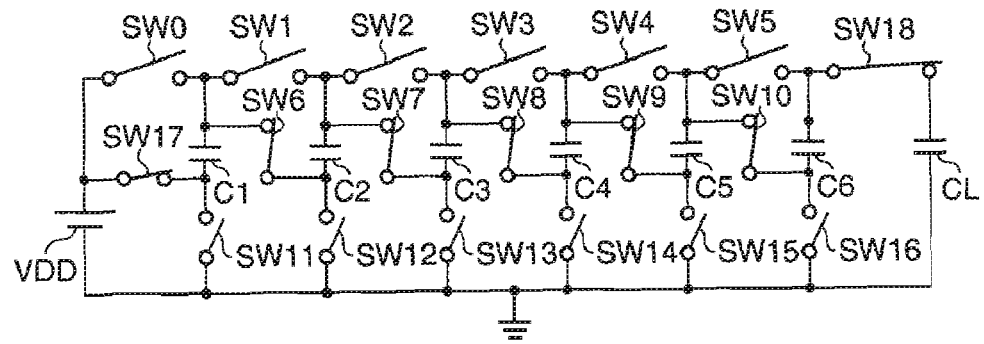

FIGS. 2A and 2B are circuit diagrams illustrating the operation of the booster circuit in FIG. 1.

In FIG. 2A illustrating a charge operation, the kick capacitors C1 to C6 are connected in parallel to the direct current power supply source VDD by turning on the switches SW0 to SW5, and SW11 to SW16, while turning off the switches SW6 to SW10, SW17, and SW18. As a result, a voltage supplied from the direct power supply source VDD is applied to each of the kick capacitors C1 to C6, thereby an electric charge according to the voltage supplied from the direct power supply source VDD is charged in each of the kick capacitors C1 to C6.

In FIG. 2B illustrating a pump-up operation, the kick capacitors C1 to C6 are connected in series with the direct current power supply source VDD by turning off the switches SW0 to SW5, and SW11 to SW16, while turning on the switches SW6 to SW10, SW17, and SW18. As a result, each voltage applied to each of the kick capacitors C1 to C6 by the direct current power supply source VDD, and the voltage supplied from the direct current power supply source VDD are added and output, thereby a boosted voltage according to the number of connecting stages of the kick capacitors C1 to C6 can be obtained.

In this regard, if the parasitic capacitance Csub1 is present in the kick capacitors C1 to C6, the boosted voltage obtained by the pump-up operation is lowered.

Figure 3:
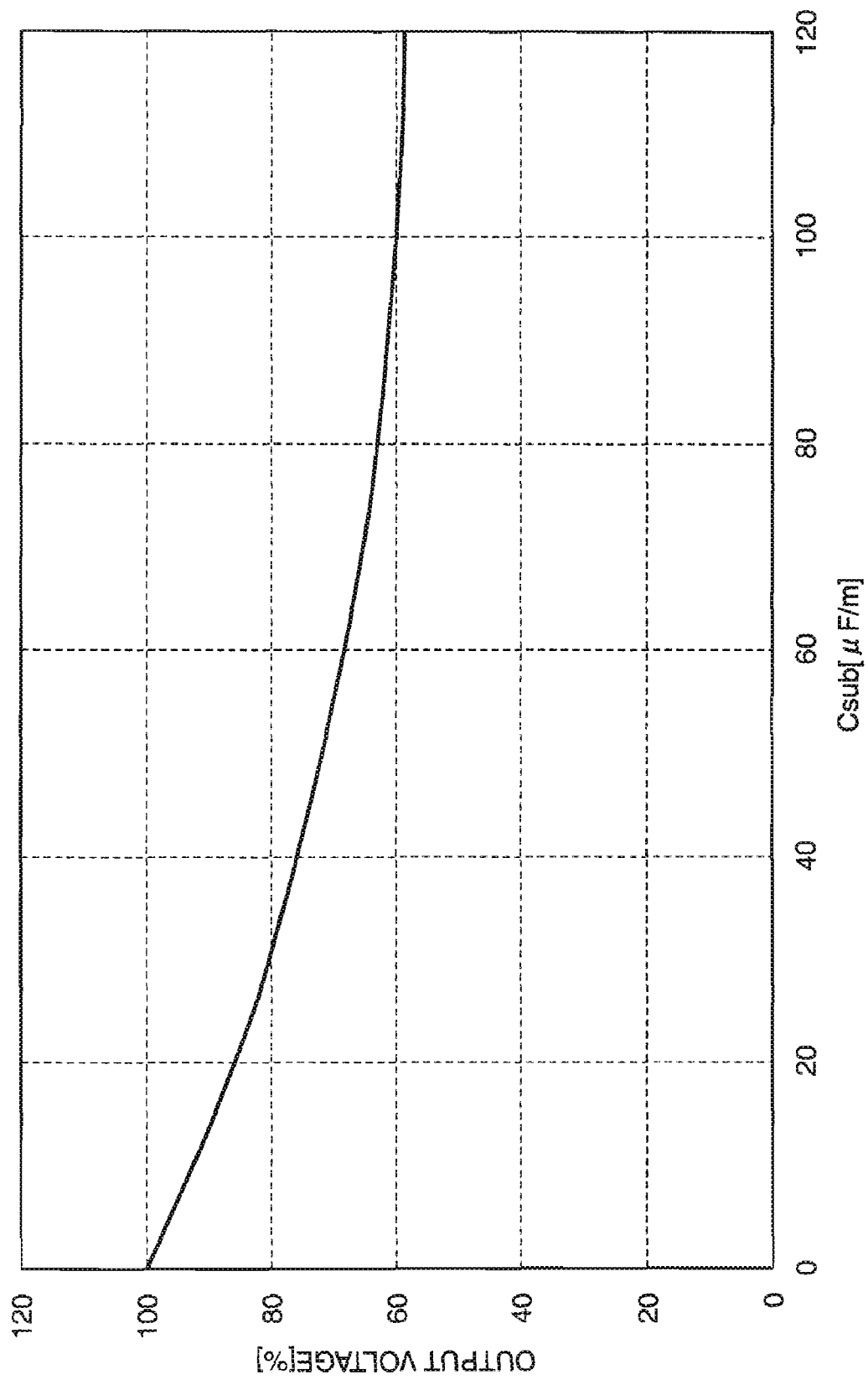
FIG. 3 shows a relation between the boosted voltage and the parasitic capacitance of the booster circuit in FIG. 1.

FIG. 3 shows a relation, which is obtained by a calculation, between the boosted voltage of the booster circuit in FIG. 1 and the parasitic capacitance.

As is clear from FIG. 3, the more the parasitic capacitance Csub of kick capacitor increases, the more the boosted voltage HVOUT obtained by the pump-up operation decreases.

Accordingly, the kick capacitors C1 to C6 in FIG. 1 that are structured by the MOS capacitor having the SOI structure allow each of the BOX layer capacitances CB1 to CB6 to be capacitively coupled in series with each of the depletion layer capacitances Cd1 to Cd6 formed in a semiconductor substrate. As a result, the parasitic capacitance Csub1 that acts to the kick capacitors C1 to C6 can be reduced. Thus, the kick capacitors C1 to C6 used in a switched capacitor method can be structured by a MOS capacitor while the parasitic capacitance Csub1 is lowered, thereby a boosted voltage can be increased while increasing of an element area is depressed.

FIGS. 4A and 4B are cross-sectional views and equivalent circuit diagrams illustrating the structure of the kick capacitor of the booster circuit in FIG. 1 compared to an example of an bulk transistor of related art. FIG. 4A shows a case where a MOS capacitor is fabricated on a bulk substrate. FIG. 4B shows a case where a MOS capacitor is fabricated on an SOI substrate.

In FIG. 4A, a well 12 is formed in a semiconductor substrate 11. A depletion layer 13 having a depth of d1 is formed along the bonded surface of the semiconductor substrate 11 and the well 12. On the semiconductor substrate 11, a gate electrode 15 is formed with a gate insulation film 14 therebetween. To the sidewall of the gate electrode 15, a sidewall 16 is formed. A source layer 17a is formed in the well 12 adjacent to one side of the gate electrode 15, while a drain layer 17b is formed in the well 12 adjacent to the other side of the gate electrode 15. Around the well 12, highly doped impurity diffusion regions 18a and 18b are formed to contact a back gate. The gate electrode 15 is connected to the source layer 17a, the drain layer 17b, and the highly doped impurity diffusion regions 18a and 18b through a direct current power supply source Va1.

In a case where a MOS capacitor is formed on a bulk substrate, a parasitic capacitance Csub11 including a depletion layer capacitance Cd11 is added in parallel with a MOS capacitance Cg11 of the MOS capacitor. The depletion layer capacitance Cd11 varies by an impurity concentration Nsub of the semiconductor substrate 11, an impurity concentration $N_D$ of the well 12, and a voltage E1 of the direct current power supply source Va1.

The depletion layer capacitance Cd11 is expressed by the following formula (1).

$$Cd11 = \sqrt{\frac{q\varepsilon_{si} Nsub}{2(Vbi + E1)}} \quad \text{formula (1)}$$

where q is the elementary electric charge (=1.60218×10$^{-19}$ coulomb), $\varepsilon_{si}$ is the dielectric constant of silicon (=1.053×10$^{-10}$ F/m) and Vbi is the built-in potential, which varies by $N_D$.

Here, Nsub is 1E21 cm$^3$ in a case where a typically used p-type silicon wafer is used. $N_D$ is Nsub or more due to the characteristic of a CMOS process, in order to maintain PN diode characteristics. If $N_D$=Nsub, Vbi=0.6 V. The larger is $N_D$, the larger is Vbi. Accordingly, the maximum of Cd11 is obtained to be Cd11=120 μFm by formula (1), when E1=0V.

In contrast, in FIG. 4B, an insulation layer 22 is formed on a semiconductor substrate 21. On the insulation layer 22, a semiconductor layer 24 is formed. In the semiconductor substrate 21, a depletion layer 23 having a depth of d2 is formed along the bonded surface of the semiconductor substrate 21 and the insulation layer 22. As the material for the semiconductor substrate 21 and the semiconductor layer 24, for example, Si, Ge, SiGe, SiC, SiSn, PbS, GaAs, InP, GaP, GaN, ZnSe, and the like can be used. As the insulation layer 22, for example, $SiO_2$, SiON, and an insulation layer or buried insulation layer of SiON or $Si_3N_4$ can be used. As the semiconductor substrate 21 in which the semiconductor layer 24 is formed on the insulation layer 22, for example, an SOI substrate can be used. A separation by implanted oxygen (SIMOX) substrate, a bonded substrate, a laser annealed substrate, and the like can be used as the SOI substrate. Instead of using the semiconductor substrate 21, an insulation substrate such as sapphire, glass, and ceramic may be used.

On the semiconductor layer 24, a gate electrode 26 is formed with a gate insulation film 25 therebetween. To the sidewall of the gate electrode 26, a sidewall 27 is formed. A source layer 28a is formed in the semiconductor layer 24 adjacent to one side of the gate electrode 26, while a drain layer 28b is formed in the semiconductor layer 24 adjacent to the other side of the gate electrode 26. The gate electrode 26 is connected to the source layer 28a, and the drain layer 28b through a direct current power supply source Va2.

In a case where a MOS capacitor is formed on a SOI substrate, a parasitic capacitance Csub21 including a depletion layer capacitance Cd21 capacitively coupled in series with a BOX layer capacitance CB21 is added in parallel with a MOS capacitance Cg21 of the MOS capacitor.

As a result, the parasitic capacitance Csub21 in FIG. 4B is smaller than the parasitic capacitance Csub11 in FIG. 4A. Namely, a parasitic capacitance added to a MOS capacitor can be reduced by forming the MOS capacitor on an SOI substrate compared to a case where the MOS capacitor is formed on a bulk substrate. For example, the parasitic capacitance Csub21 can be reduced by approximately 70% as Csub21 is calculated to be 0.012 pF with the following conditions: the film thickness of the insulation layer 22 is 2000 nm; and the depletion layer capacitance Cd21 in FIG. 4B is equal to the depletion layer capacitance Cd11 in FIG. 4A.

CB21 and Csub21 are respectively expressed by the following formulas (2) and (3).

$$CB21 = \frac{\varepsilon_{sio}}{d_{BOX}} \quad \text{formula (2)}$$

$$Csub21 = \frac{CB_{21} \times Cd_{21}}{CB_{21} + Cd_{21}} \quad \text{formula (3)}$$

where $\varepsilon_{si}$ is the dielectric constant of silicon dioxide, and $d_{BOX}$ is the thickness of the buried oxide film. The maximum of the depletion layer capacitance is 120 µFm. In order to make Csub21 30 µFm or less, preferably, 10 µFm, the thickness of the buried oxide film is preferably 19 nm or more, more preferably, 57 nm or more. This makes it possible to further reduce the parasitic capacitance.

Figure 5:
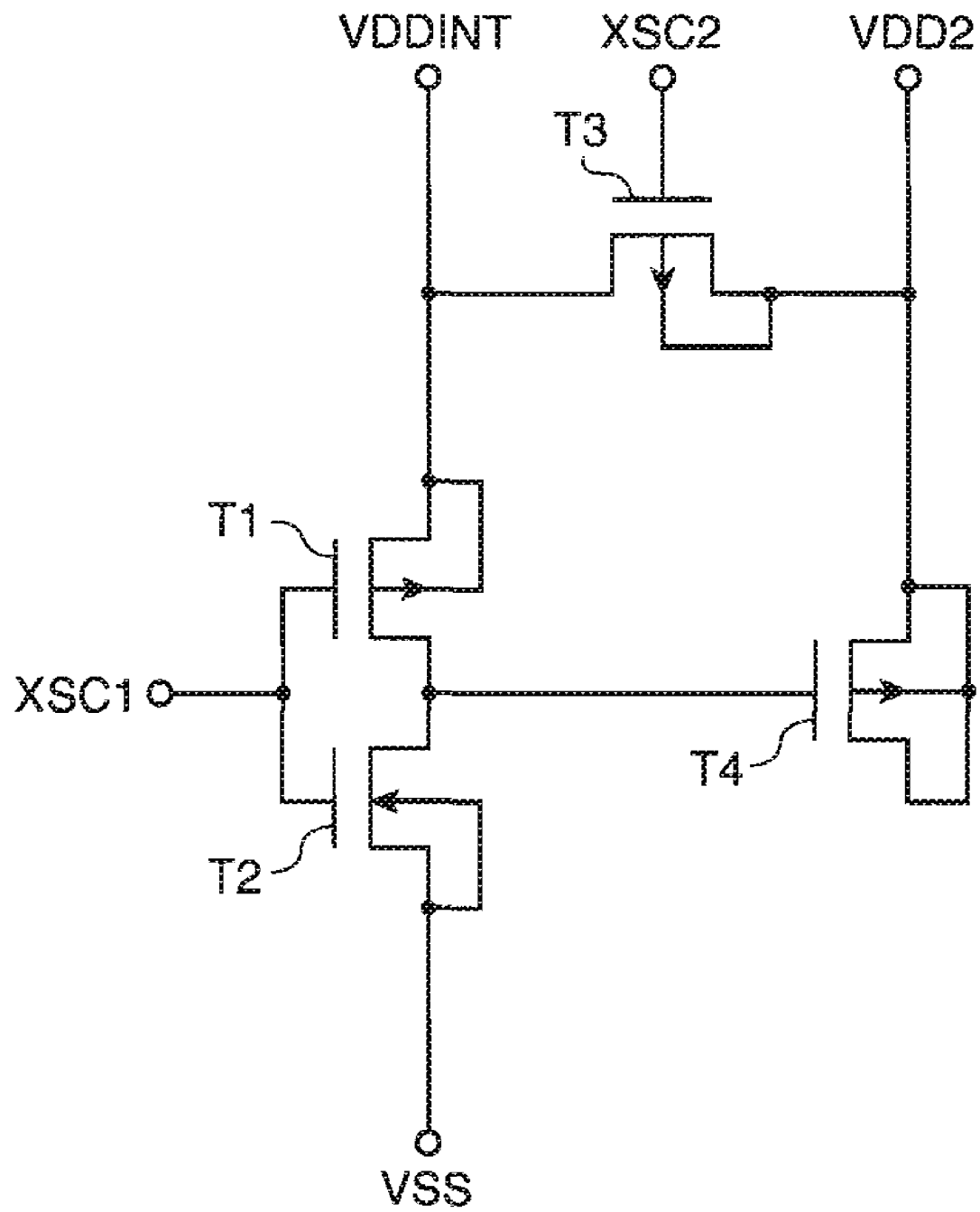
FIG. 5 shows a circuit structure of one stage of the booster circuit in FIG. 1.

FIG. 5 shows a circuit structure of one stage of the booster circuit in FIG. 1.

In FIG. 5, for example, the switches and kick capacitor in FIG. 1 can be structured as follows: the switch SW8 is structured by an P channel electric field effect transistor T1, the switch SW13 is structured by a N channel electric field effect transistor T2, the switch SW3 is structured by an P channel electric field effect transistor T3, and the kick capacitor C3 is structured by an P channel electric field effect transistor T4. Here, the P channel electric field effect transistor T4 can be structured by a MOS capacitor having an SOI structure.

In the structure, the sources of the P channel electric field effect transistor T1 and the N channel electric field effect transistor T2 are connected to the gate of the P channel electric field effect transistor T4. The drain of the P channel electric field effect transistor T1 is connected to the source of the P channel electric field effect transistor T3. The drain of the P channel electric field effect transistor T3 is connected to the source and drain of the P channel electric field effect transistor T4.

In addition, a first control signal XSC1, which turns on or off the P channel electric field effect transistor T1 and the N cannel electric field effect transistor T2, is input to the gates of the P channel electric field effect transistor T1 and the N channel electric field effect transistor T2. A second control signal XSC2, which turns on or off the P channel electric field effect transistor T3, is input to the gate of the P channel electric field effect transistor T3. The first control signal XSC1 and the second control signal XSC2 can use pulse signals each having a phase opposite to each other.

In the charging operation, the first control signal XSC1 is set to be a low level, while the second control signal XSC2 is set to be a high level. After the setting, the P channel electric field effect transistor T1 is turned off, and the N channel electric field effect transistor T2 and the P channel electric field effect transistor T3 are turned on. As a result, the voltage of the direct current power supply source VDD is applied to the P channel electric field effect transistor T4, thereby electric charges are stored in the P channel electric field effect transistor T4.

In the pump-up operation, the first control signal XSC1 is set to be the high level, while the second control signal XSC2 is set to be the low level. After the setting, the P channel electric field effect transistor T1 is turned on, and the N channel electric field effect transistor T2 and the P channel electric field effect transistor T3 are turned off. As a result, the output voltage from the Kick capacitor C2 serving as the previous stage is applied to the gate of the P channel electric field effect transistor T4, thereby the output voltage from the source and drain of the P channel electric field effect transistor T4 is applied to the kick capacitor C4 serving as the subsequent stage.

Figure 6:
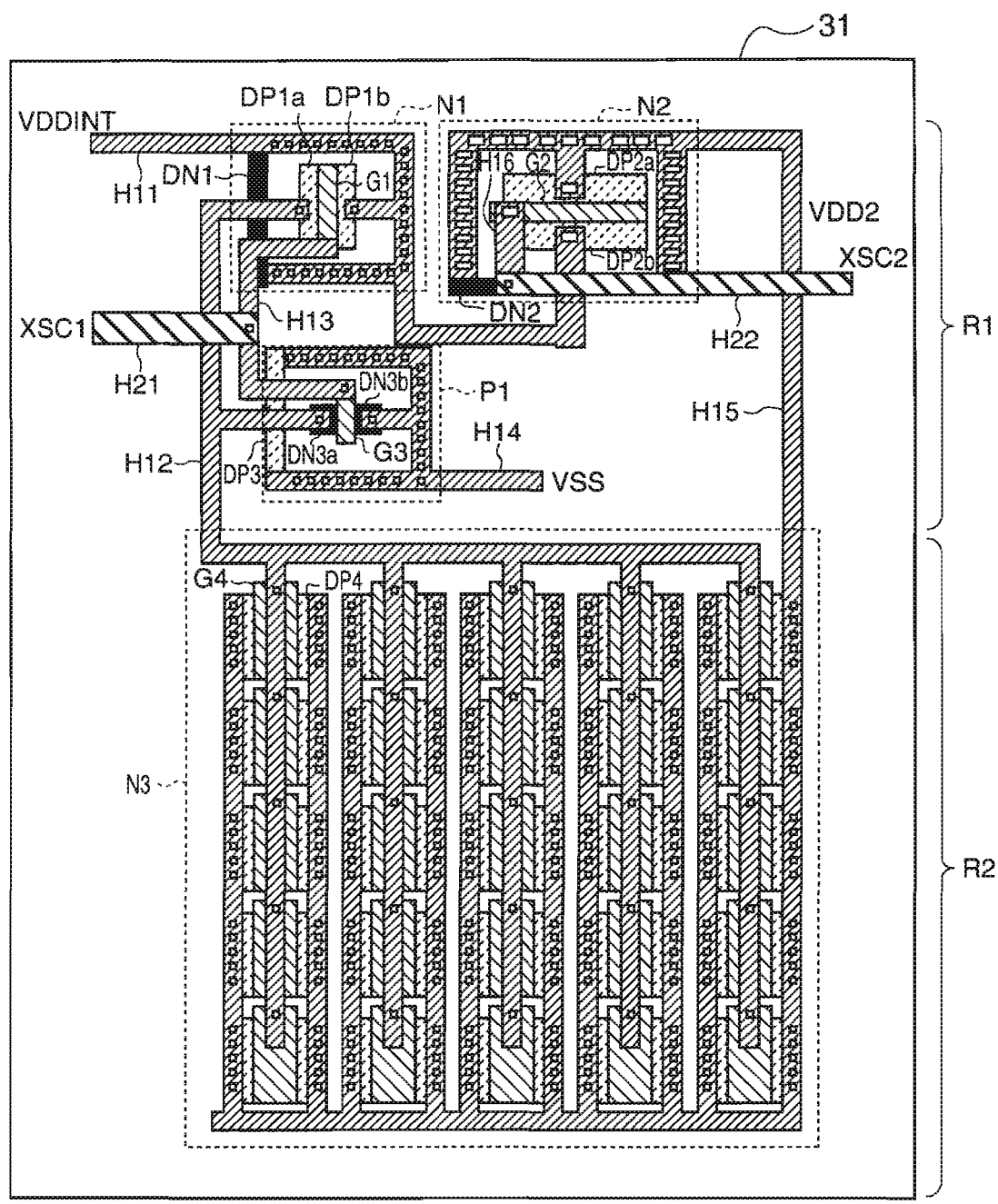
FIG. 6 shows a layout pattern of one stage of the booster circuit in FIG. 1.

FIG. 6 is a plan view illustrating a layout pattern of one stage of the booster circuit in FIG. 1.

In FIG. 6, a bulk region R1 and an SOI forming region R2 are provided in a semiconductor chip 31. In the bulk region R1, N wells N1 and N2, and a P well P1 are formed. In the SOI forming region R2, an N well N3 is formed. The P channel electric field effect transistors T1, T3, and T4 in FIG. 5 are respectively formed to the N wells N1, N2, and N3, while the N channel electric field effect transistor T2 in FIG. 5 is formed to the P well P1.

On the P well P1, a gate electrode G3 is formed. In the P well P1, N type impurity diffusion layers DN3a and DN3b are formed so as to sandwich the gate electrode G3. Around the P well P1, a P type impurity diffusion region DP3 is formed to contact a back gate.

On the N well N1, a gate electrode G1 is formed. In the N well N1, P type impurity diffusion layers DP1a and DP1b are formed so as to sandwich the gate electrode G1. Around the N well N1, an N type impurity diffusion region DN1 is formed to contact a back gate.

On the N well N2, a gate electrode G2 is formed. In the N well N2, P type impurity diffusion layers DP2a and DP2b are formed so as to sandwich the gate electrode G2. Around the N well N2, an N type impurity diffusion region DN2 is formed to contact a back gate.

On the N well N3, a gate electrode G4 is formed. In the N well N3, a P type impurity diffusion layers DP4 is formed so as to sandwich the gate electrode G4.

The N type impurity diffusion region DN1, and the P type impurity diffusion layers DP1a and DP2b are connected through a lower wiring layer H11. The gate electrode G4, the P type impurity diffusion layer DP1a, and the N type impurity diffusion layer DN3a are connected through a lower wiring layer H12. The gate electrodes G1 and G3 are connected through a lower wiring layer H13. The N type impurity diffusion layer DN3b, and the P type impurity diffusion region DP3 are connected through a lower wiring layer H14. The P type impurity diffusion layers DP2a, DP4, and the N type impurity diffusion region DN2 are connected through a lower wiring layer H15. The lower wiring layer H13 is connected to an upper wiring layer H21, to which the control signal XSC1 is input. The lower wiring layer H16 is connected to an upper wiring layer H22, to which the control signal XSC2 is input.

Accordingly, a parasitic capacitance that acts to a MOS capacitor can be reduced, even in a case where the MOS capacitor is structured by the P channel electric field effect transistor T4, since the P channel electric field effect transistor T4 is formed in the SOI forming region R2. Thus, a kick capacitors used in a switched capacitor method can be structured by a MOS capacitor while the parasitic capacitance is lowered, thereby a boosted voltage can be increased while increasing of an element area is depressed.

Further, breakdown voltage of a switching element used in a switched capacitor method can be prevented from being deteriorated even though a case where a MOS capacitor includes an SOI structure, since the P channel electric field effect transistors T1, T3, and the N channel electric field effect transistor T2 are formed in the bulk region R1. As a result, a boosted voltage can be increased.

What is claimed is:

1. A booster circuit, comprising:
   a first electric field effect transistor performing a first on-off operation based on a first control signal;
   a second electric field effect transistor performing a second on-off operation based on the first control signal, the first on-off operation and the second on-off operation being reversed;
   a third electric field effect transistor performing the first on-off operation based on a second control signal having a phase opposite the first control signal; and
   a fourth electric field effect transistor included in a metal oxide semiconductor (MOS) capacitor,
   sources of the first electric field effect transistor and the second electric field effect transistor being coupled to a gate of the fourth electric field effect transistor,
   a drain of the first electric field effect transistor being coupled to a source of the third electric field effect transistor,
   a drain of the third electric field effect transistor being coupled to a source and a drain of the fourth electric field effect transistor, and
   the fourth electric field effect transistor including a silicon on insulator (SOI) structure.

2. The booster circuit according to claim 1, thickness of a buried oxide film of the SOI structure being 10 nm or more.

3. The booster circuit according to claim 1, thickness of a buried oxide film of the SOI structure being 57 nm or more.

4. The booster circuit according to claim 1, first through third electric field effect transistors being formed on a bulk substrate.

* * * * *